Figure 1:
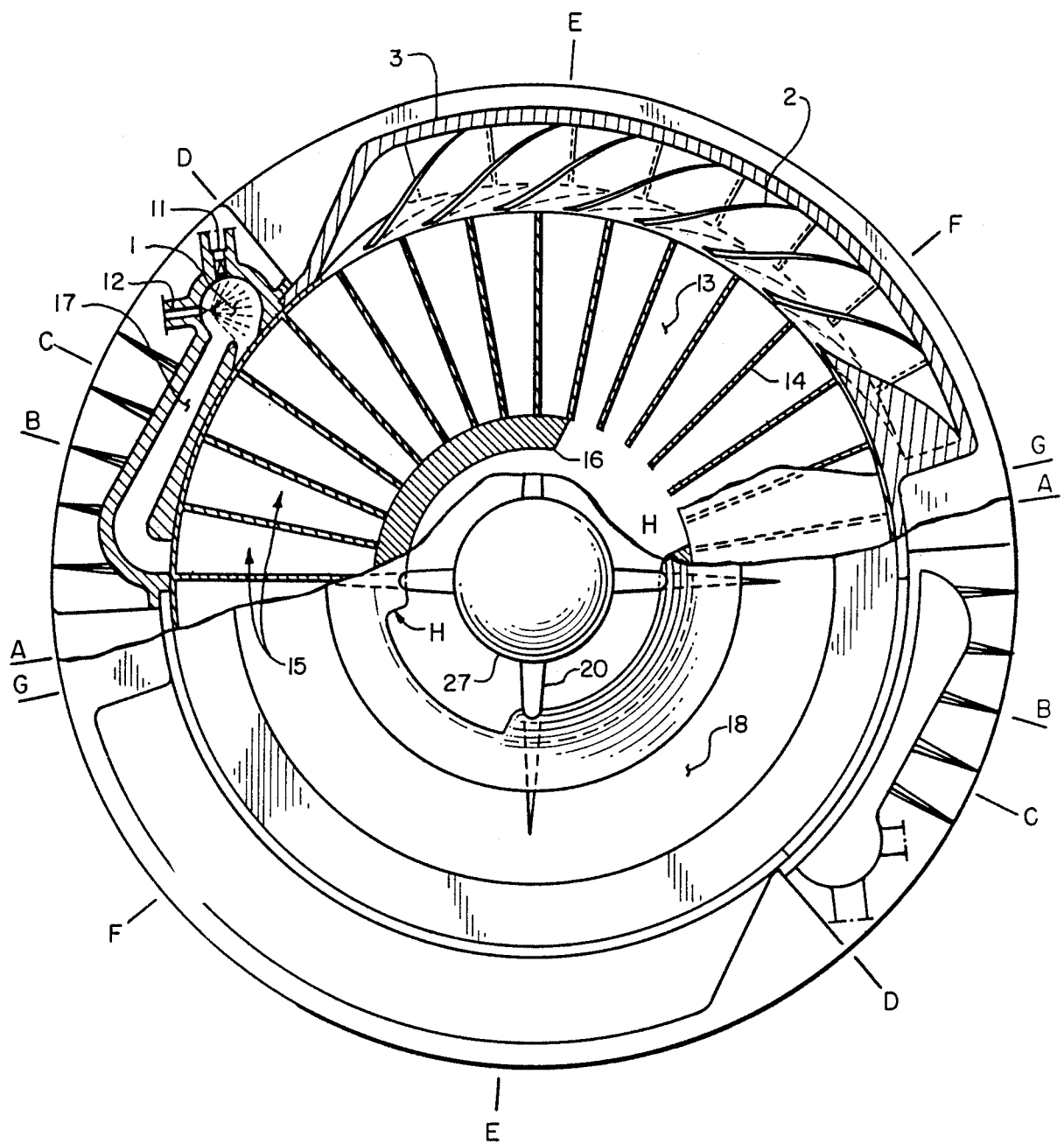

United States Patent [19]

Skoczkowski et al.

[11] Patent Number: 4,835,960
[45] Date of Patent: Jun. 6, 1989

[54] HIGH COMPRESSION GAS TURBINE ENGINE

[76] Inventors: Andzej M. Skoczkowski, 919 N. Campbell Ave., Chicago, Ill. 60622; Andrew P. Rychlak, 5300 S. Central Ave., Chicago, Ill. 60638

[21] Appl. No.: 400,759

[22] Filed: Jul. 22, 1982

[51] Int. Cl.⁴ .............................. F02C 3/16; F02C 5/04
[52] U.S. Cl. .................................... 60/39.34; 60/39.43
[58] Field of Search ................ 60/39.34, 39.35, 39.43, 60/39.44, 732, 733

[56] References Cited

U.S. PATENT DOCUMENTS

| | | | |
|---|---|---|---|
| 1,388,707 | 8/1921 | Heinze | 60/39.35 X |
| 2,448,972 | 9/1948 | Gizara | 60/39.35 |
| 2,705,867 | 4/1955 | Lewis | 60/39.34 |
| 3,057,157 | 10/1962 | Close | 60/39.43 X |
| 3,150,646 | 9/1964 | Bernard | 60/39.34 X |
| 3,200,588 | 8/1965 | Math | 60/39.34 X |
| 3,224,711 | 12/1965 | Warren et al. | 60/39.34 |
| 3,321,911 | 5/1967 | Myles | 60/39.35 |
| 4,062,182 | 12/1977 | Fehler et al. | 60/733 X |

FOREIGN PATENT DOCUMENTS

| | | | |
|---|---|---|---|
| 2840662 | 4/1980 | Fed. Rep. of Germany | 60/39.43 |
| 30757 | 5/1911 | Sweden | 60/39.34 |
| 2017222 | 10/1979 | United Kingdom | 60/39.34 |

OTHER PUBLICATIONS

Carlstrom et al, "Improved Emissions Performance in Today's Combustion System", International Seminar, AEG/SOA, 6-78, p. 17.

Primary Examiner—Donald E. Stout
Attorney, Agent, or Firm—John J. Kowalik

[57] ABSTRACT

A high compression gas turbine engine which comprises a power generating rotor assembly which aspirates air at diametrically opposite areas. The power generating component is divided circumferentially into a fresh air intake sector, followed by an air compression sector, followed by a first partial burning fuel injector sector from a precombustion chamber continuously feeding partially burned fuel gases from a precombustion chamber and deflagration of the fuel with increasing pressure of gases, part of which feed back into the precombustion chamber and pressurize the partially burning gases therein for injection into the fuel injection sector. The high pressure gases are then channeled through rotors and stators for driving the power output shaft.

10 Claims, 2 Drawing Sheets

HIGH COMPRESSION GAS TURBINE ENGINE

BACKGROUND OF THE INVENTION

Conventional internal combustion engines are well-known. Improvements of such engines naturally led to the development of the gas turbine engines. The principal advantage of the gas turbine engine is a favorable "grvity power index," i.e. weight to power (kg/km) ratio, which made such engines particularly adaptable to aircraft application.

On the other hand, the application of a gas turbine engine to land craft, such as an automobile, requires extensive use of expensive and bulky heat exchangers. This not only complicates the construction and increases the weight of the engine, but prohibitively increases the cost of such engines.

The maximum efficiency of the piston engines and the gas turbine is between 30% and 40%; the remaining chemical energy of the fuel is wasted.

Of major consequence is the large efficiency drop of a gas turbine under partial power utilization, and therefore is not preferably applicable to land crafts.

SUMMARY OF THE INVENTION

This invention is directed to providing a novel turbine engine which can be constructed of relatively inexpensive materials and provides a high output beyond that of conventional turbines.

The invention comprehends a novel arrangement of components which utilize the chemical energy of the fuel in a more efficient manner than heretofore contemplated, and thus consumes relatively low amounts of fuel.

The invention is concerned with providing a turbine engine which has a novel cooling arrangement such as will maintain the internal cycle temperature between 3272° F. (1800° C.) and 3632° F. (2000° C.), by introducing blasts of cool air throughout its inner segments.

The invention also has for its object the provision of a simple, compact and light engine.

The invention contemplates providing a novel turbine engine which is readily applicable to automobiles, trucks, motor boats and also aircraft.

The invention contemplates the production of the novel engine from lightweight metals such as aluminum for the housing, etc.

The novel engine is of simple construction and eliminates such conventional components as separate compressors and heat exchangers, and preferably runs on diesel fuel. There is no need for oil changes as in piston engines and the only lubrication required is for lubrication of the shaft bearings.

The invention has for its principal object a novel internal combustion system which provides construction of unique turbine and jet turbine engines.

Figure 2:
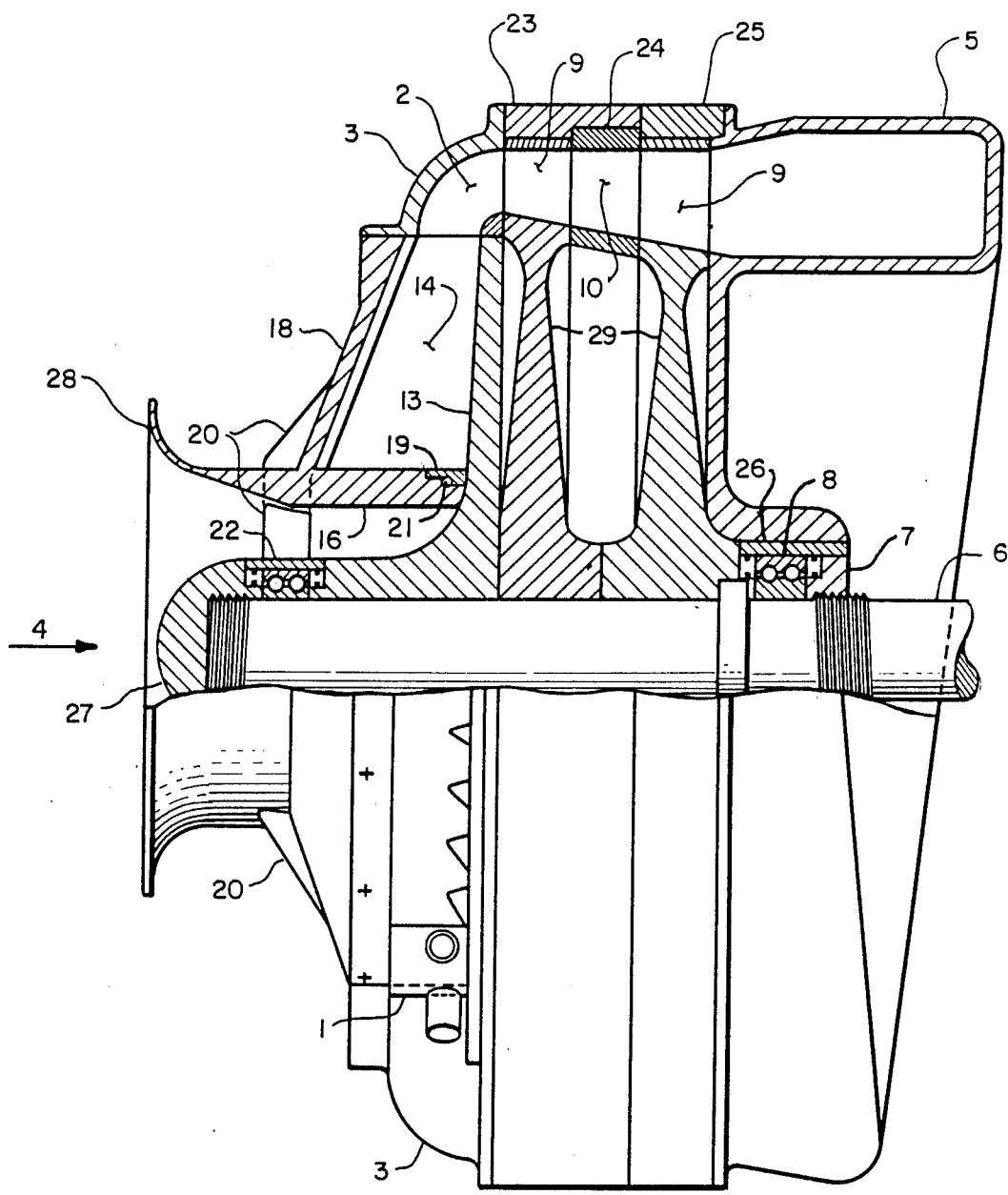

These and other objects and advantages inherent in and encompassed by the invention will become more apparent from the specification and the drawings, wherein:

FIG. 1 is an elevational view partly in cross-section of the novel engine taken from the intake end thereof, and FIG. 2 is a side elevational view partly in axial section.

DESCRIPTION OF THE INVENTION

The engine generally designated R comprises a housing T which has a forwardly flaring tubular air inlet collar 28 at its forward end. The air inlet collar 28 is notched at its rear and comprises a pair of circumferentially spaced flange rings 16, 16 about which there are two resilient half ring gaskets 19, which are biased by two flat springs 21, against a radially extending opposing side wall 13a of a gas generator rotor 13.

The air inlet collar 28 is held concentric with the axis of the rotor by means of four or more tear shaped bearing seat supports 20 protruding between the air inlet collar 28 and a face plate cover 18. the face plate cover 18 along with the air inlet collar 28 and the bearing seat supports 20 form a pressure casting.

The rotor 13 has a forwardly extending hub which projects into the air inlet collar and is sleeved onto output shaft 6 and made fast thereto in any conventional manner.

The rotor 13 has a plurality of radially extending chambers 15 which are defined by annular front wall 14a and a series of circumferentially spaced radial blades 14 which connect the wall 14a with rotor wall 13a. It will be apparent that the wall 14a converges outwardly with wall 13a toward the outer outlet ends 13b of rotor 13. The outlet ends 13b lead into gas collectors 3, which form part of a power receptor and are fastened to the face plate 18 and to rings 23 and 25 and to an exhaust manifold 5. Air is aspirated into the combustion chambers 15 from the air intake 4 through diametrically spaced notches K between the ends of the split rings 16,16, into the center of the rotor 13 by centrifugal action.

The collectors 3 comprise a circumferentially spaced series of blades 2 which form passages 30. The blades 2 provide inlets 3b of the collectors 3 communicating with the outlet ends 13b of the rotor 13 and direct high pressure exhaust gases from main combustion chambers 15 through a series of axially directed passages 9a defined by blades 9 in a first turbine rotor 29 which is also part of the power receptor. The rotor 29 is fastened to the shaft 6.

The gasses are directed by the turbine blades 9 against guide vanes 10 of a stator ring 24 (also part of the power receptor) disposed coaxially with the front and rear rotors 29, 29a forming another part of the power receptor. Subsequently gases continue discharge against turbine blades 9c of the rear rotor 29a which is fastened to the shaft 6.

The passages 9b, defined by blades 9c, in the rear rotor 29a discharge the gases into an annular exhaust manifold 5 which is supported by bearing assembly 26, held on shaft 6 by nut 7.

These parts are set on the main shaft 6 in the following order, namely, an aerodynamic protective hood 27, bearing 22, the gas generator or power rotor 13, the two turbine rotors 29,29a and bearing 8.

Two ignition systems are fastened to the housing T and the face plate 18 between the collectors 3. Each ignition system comprises one gas ignition chamber 1, also called a precombustion chamber, one fuel injector 12, one glow plug 11 and one fuel distribution or intake channel M.

SPECIFICATION OF ENGINE ACTIVITY

In operation, the engine is started by cranking the shaft 6 with an electric starter coupled thereto in conventional manner, just as in diesel engines.

As the engine is rotated, air is aspirated through the air intake 4 and diverted through notches K into rotating main combustion chambers 15.

As best seen in FIG. 1, the air enters that section of chambers 15 which are located in the sector E-G of the engine circumference. Sector E-G is divided into two sections E-F and F-G. In the E-F section said air, being of ambient temperature is accelerated radially outwardly by centrifugal vorce, cools the walls of the components through which it passes including: the walls of the main combustion chambers 15, the walls of the collector 3, collector vanes 2, turbine blades 9, 9c and guide vanes 10. this phase comprises the inner cooling of the engine. Thus the cool air flows through the hot parts of the engine through which the heated gases of combustion subsequently flow.

When the segment of the rotor 13 advances to the F-G sector, this accelerated air stream is suddenly trapped at the outer ends of rotor chambers 15 by the wall 3d of the collector 3. This effects aero-dynamic compression in the main internal combustion chambers 15.

At point H, compressed air in the rotating chambers remains closed at the side of air inlet with the split flange ring 16, and there are thus created so-called rotational closed combustion chambers. this region is termed a primary compression sector.

As this section of chambers 15 with air under primary compression moves to sector A-B, their radially outer ends 13b sequentially align radially with a gas port 17a through which burning gases are introduced via a passage 17 in fuel intake channel M. This channel M leads to the precombustion gas chamber 1. An atomized fuel, which is initially ignited by glow plug 11, is introduced through the fuel injector 12 into said gas chamber 1. The gas chamber 1 also communicates with the respective chamber of the power rotor which is aligned with port 1a.

It will be observed that between A-B points burning gases are forced under pressure of many atmospheres from the gas chamber 1 through the passage 17 and port 17a to combustion chambers 15. In this segment of engine operation secondary compression follows and gas combustion with amply oxygen enriched compressed air begins. Between B and C the combustion maximizes causing further increase in pressure and temperature. This combustion occurs at constant capacity of chambers 15.

Since there is an excess of oxygen in the compressed air, part of it is not consumed and remains in the exhaust gases. In the sector C-D of the engine circumference, part of the exhaust gases are forced dynamically into the gas chamber 1 where the fuel injector continuously injects atomized fuel. The high temperature of about 3632° F. of the exhaust gases with the included small amount of oxygen, causes the fuel to completely vaporize and self-ignite. These burning gases are dynamically forced through passage 17 and port 17a into the combustion chambers 15 as they align and pass the port 17a.

The sector D-E is where the highly compressed gases and discharged through the passages 30 in collectors 3 into the front turbine blades 9, the guide vanes 10 and the rear turbine blades 9c, and discharge into the exhaust manifold 5.

The kinetic energy of the exhaust gases effected by high pressure difference is converted into a work force on the turbine blades 9, 9c, causing the turbines 29, 29a to rotate.

At point E of the engine circumference, the pressure of the exhaust gases in the combustion chambers 15 is very near to atmospheric pressure. Thereafter the exhausted chambers 15 align with the appropriate notch K. New air is then aspirated into these chambers 15 and the cycle is repeated.

It will be appreciated that during one full cycle two functions are effected. On the E-G sector the rotor 13 works as a centrifugal compressor, while in the other parts of the circumference the rotor blades 14 create combustion chambers 15. Thus in a full circle, there are two complete working cycles.

In low gear and partial load, the engine maintains a high compression ratio and cycle temperature, which allows it to retain high efficiency. This is a fundamental feature for a basic application of this type of gas turbine engine in various automotive vehicles.

SPECIFICATION OF ENGINE ACTIVITY

Theoretical calculations of cycle efficiency depends upon a given degree of compression and cycle temperature illustrated in our correlative table.

Here is a list of definitions of symbols used with the table:

$P_1$—Atmospheric Pressure 1 AT or (One Technical ATM)

$T_1$—293° K.=(20° C.) Ambient Temp.

X—1.4 Gas Constant $\pi = P_2/P_1$—Compression Ratio (Pressure Ratio During Compression)

$\lambda$—Pressure Ratio During Burnout $T_2$—Max. Cycle Temperature $\eta_t$—Cycle Efficiency $\Delta P = P_2(T_2 - T_1)/T_1$—Pressure Gain (Increase)

$P_2$—Total Increase in Compression

| a | b | c | d | e | f | g | h | i | | |
|---|---|---|---|---|---|---|---|---|---|---|
| Primary Dynamic Compression Imposed Values | Secondary Compression Imposed Values | Total Increase in Compression $P_2$ (kg/cm²) a + b | Maximum Cycle Compression $\Delta P$(kg/cm²) $P_2 \frac{T_2 - T_1}{T_1}$ | Initial Work Pressure On The Turbine (kg/cm²) d − b | Maximum Cycle Temperature (°C.) Imposed Values | Pressure Ratio During Burnout $\lambda$ d ÷ c | Cycle Temperature $T_2$ (°K.) f + 273° C. | Cycle Efficiency $\eta_t$ | $1 - X \dfrac{1}{\pi \dfrac{X-1}{X}}$ | $\lambda \dfrac{\frac{1}{X} - 1}{\lambda - 1}$ |
| 1 | 1 | 1 | 2 | 3.3 | 2.3 | 500° C. | 1.6 | 773° K. | 0.24 | |
| 2 | 1 | 2 | 3 | 4.9 | 2.9 | 500° C. | 1.6 | 773° K. | 0.32 | |
| 3 | 2 | 2 | 4 | 6.6 | 4.5 | 500° C. | 1.6 | 773° K. | 0.37 | |
| 4 | 2 | 3 | 5 | 8.2 | 5.1 | 500° C. | 1.6 | 773° K. | 0.41 | |

-continued

| | a | b | c | d | e | f | g | h | i |
|---|---|---|---|---|---|---|---|---|---|
| | Primary Dynamic Compression Imposed Values | Secondary Compression Imposed Values | Total Increase in Compression $P_2$ (kg/cm$^2$) $a + b$ | Maximum Cycle Compression $\Delta P$(kg/cm$^2$) $P_2 \dfrac{T_2 - T_1}{T_1}$ | Initial Work Pressure On The Turbine (kg/cm$^2$) $d - b$ | Maximum Cycle Temperature (°C.) Imposed Values | Pressure Ratio During Burnout $\lambda$ $d \div c$ | Cycle Temperature $T_2$ (°K.) $f + 273°$ C. | Cycle Efficiency $\eta_t$ $1 - X \dfrac{1}{\pi \dfrac{X-1}{X}} \dfrac{\lambda \dfrac{1}{X} - 1}{\lambda - 1}$ |
| 5 | 3 | 2 | 5 | 8.2 | 6.1 | 500° C. | 1.6 | 773° K. | 0.41 |
| 6 | 1 | 2 | 3 | 8.0 | 5.0 | 800° C. | 2.6 | 1,073° K. | 0.37 |
| 7 | 2 | 2 | 4 | 10.6 | 8.6 | 800° C. | 2.5 | 1,073° K. | 0.42 |
| 8 | 2 | 3 | 5 | 13.3 | 8.3 | 800° C. | 2.6 | 1,073° K. | 0.46 |
| 9 | 3 | 2 | 5 | 13.3 | 11.3 | 800° C. | 2.6 | 1,073° K. | 0.46 |
| 10 | 3 | 3 | 6 | 16.0 | 13.0 | 800° C. | 2.7 | 1,073° K. | 0.49 |
| 11 | 4 | 3 | 7 | 18.6 | 15.6 | 800° C. | 2.6 | 1,073° K. | 0.51 |
| 12 | 5 | 4 | 9 | 24.0 | 20.0 | 800° C. | 2.7 | 1,073° K. | 0.55 |
| 13 | 5 | 5 | 10 | 26.6 | 21.6 | 800° C. | 2.6 | 1,073° K. | 0.56 |
| 14 | 2 | 2 | 4 | 13.4 | 13.0 | 1,000° C. | 3.2 | 1,273° K. | 0.45 |
| 15 | 3 | 3 | 6 | 20.0 | 14.0 | 1,000° C. | 3.3 | 1,273° K. | 0.51 |
| 16 | 4 | 4 | 8 | 27.0 | 23.0 | 1,000° C. | 3.4 | 1,273° K. | 0.55 |
| 17 | 5 | 5 | 10 | 33.4 | 28.4 | 1,000° C. | 3.3 | 1,273° K. | 0.58 |
| 18 | 5 | 8 | 13 | 43.5 | 35.5 | 1,000° C. | 3.3 | 1,273° K. | 0.61 |
| 19 | 5 | 10 | 15 | 50.0 | 40.0 | 1,000° C. | 3.3 | 1,273° K. | 0.62 |
| 20 | 2 | 3 | 5 | 25.3 | 22.3 | 1,500° C. | 5.0 | 1,773° K. | 0.52 |
| 21 | 5 | 5 | 10 | 60.5 | 50.5 | 1,500° C. | 5.0 | 1,773° K. | 0.61 |
| 22 | 5 | 10 | 15 | 76.0 | 66.0 | 1,500° C. | 5.0 | 1,773° K. | 0.65 |
| 23 | 5 | 15 | 20 | 101.0 | 86.0 | 1,500° C. | 5.0 | 1,773° K. | 0.68 |
| 24 | 5 | 20 | 25 | 126.0 | 101.0 | 1,500° C. | 5.0 | 1,773° K. | 0.70 |
| 25 | 5 | 5 | 10 | 60.75 | 55.7 | 1,800° C. | 6.0 | 2,073° K. | 0.62 |
| 26 | 5 | 10 | 15 | 91.0 | 81.0 | 1,800° C. | 6.0 | 2,073° K. | 0.66 |
| 27 | 5 | 5 | 10 | 67.5 | 62.5 | 2,000° C. | 6.7 | 2,273° K. | 0.63 |
| 28 | 5 | 10 | 15 | 101.0 | 91.0 | 2,000° C. | 6.7 | 2,273° K. | 0.67 |
| 29 | 5 | 5 | 10 | 74.0 | 69.0 | 2,200° C. | 7.4 | 2,473° K. | 0.64 |
| 30 | 5 | 10 | 15 | 111.0 | 101.0 | 2,200° C. | 7.4 | 2,473° K. | 0.68 |

IGNITION SYSTEM

Our new diesel gas tturbine engine has two separate ignition systems. Each of them consists of one gas ignition chamber 1, one fuel injector 12 and a glow plug 11. In this type of high compression engine use has been made of a conventional glow plug, which is commonly used in most high compression diesel engines.

The glow plugs 11 are switched on before starting the engine and remain on only until the gas is fired and the engine starts and thereafter the plugs are turned off. The fuel injectors inject the fuel under high pressure in an atomized state directly into the gas ignition chambers 1. This process of fuel injection 12 continues until the engine is turned off. The gas ignition chambers 1 are very important segments of this engine. Their parameters have very high influence on engine performance. In the gas ignition chambers 1 phase one of the ignition process called "delayed combustion" takes place. Here, a minimal change in temperature and pressure results and a slow burn of the fuel occurs, vbecause of the low oxygen content.

The high pressure exhaust gases entering chamber 1 through port 1a transfer the slow burning gas mixture through the gas passage 17 and port 17a into the main combustion chambers 15. At the same time, the oncoming main combustion chambers 15 are being filled with pressurized cool oxygen-enriched air. When the two mixtures of gas and air meet in the main combustion chambers there is deflagration ignition and increase in temperature and compression of gases under constant volume.

In the instant gas turbine engine, due to high activity of chemical processes, which begins in the gas ignition chamber 1, the temperature, which is high, and pressurized oxygen enriched air, causes combustion many times faster in the main combustion chambers 15 than in any other conventional combustion engine. By selecting suitable dimensions of cross-sections of the gas chamber passages 17, it is possible to widely vary the secondary compression ratio in conjunction with the fuel used and the purpose of the engine.

A preferred embodiment of the invention has been described by way of example, and variation thereof will become apparent which are intended to be covered by the claims appended hereto.

What is claimed is:

1. A gas turbine engine comprising a housing,
   a fresh air inlet,
   a separate fuel supply remote from said fresh air inlet,
   means including power rotor means rotatably mounted in said housing for generating high pressure hot combustion gases, said power rotor means having inlets for fresh air and having outlets,
   power output means in said housing,
   receptor means in said housing for receiving said high pressure hot gases including stators asnd driven rotor means coupled in driving relation to said power output means, said receptor means having passages for conducting said hot combustion gases therethroubgh for powering said driven rotor means,
   means for drawing fresh air from said fresh air inlet into said power rotor means through said inlets and dicharging it through said outlets pursuant to rotation of said power rotor means,
   and means providing a purging stage for the engine for diverting a portion of said fresh air from said fresh air inlet and passing said fresh air portion directly through said power rotor means into said hot combustion gas passages of said receptor means and exhausting the same for purging the engine and internally cooling it.

2. The invention according to claim 1 wherein said power rotor means provides in addition to said purging stage, a high pressure air compression stage, a following fuel injected combustion stage and a final exhaust stage for delivering from said power rotor means to said receptor means said high compression hot gases for driving the latter.

3. The invention according to claim 1 and said power rotor means comprising a series of radial vanes defining chambers having inner and outer ends, and said air inlets being at said chambers' inner ends and said outlets being at said chambers' outer ends, said receptor means including said rotor means and stators arranged in power transfer from said power rotor means, and said means providing said purging stage communicating certain of said chambers with said passages in said rotor means and stators during a preset angle of displacement of said chambers during a fresh air intake, and means for thereafter closing off communication of said chambers at said outlets from said receptor means for effecting an air compression stage.

4. The invention according to claim 3 and said fuel supply includes a fuel charging stage comprising a fueled precombustion chamber with first and second fuel delivery passageways spaced circumferentially of the engine, said power rotor means being rotatable for moving each of said chambers thereof from an air compression stage to communication sequentially with said first passageway and then with the second, said first passageway adapted to precharge each chamber emerging from the compressed air stage with partially preignited fuel and the second passageway delivering a further charge of fuel to the precharged chambers as they rotate past the same to provide complete deflagration.

5. The invention according to claim 2 wherein said engine comprises two groups of said stages diametrically opposite to each other.

6. The invention according to claim 1 and said power rotor means providing rotating combustion chambers, said fuel supply including a precombustion chamber having means for communicating fuel gases simultaneously to several combustion chambers, and means for maintaining continuously burning gases in said precombustion chamber for cyclically firing said combustion chambers.

7. A rotary engine comprising a housing, a plurality of rotor means and intervening stator means mounted in said housing, power output shaft means connected with said rotor means, power rotor means rotatably mounted in said housing, means providing a fresh air inlet to the center of said power rotor means and also peripheral outlets and radial chambers therebetween, said housing encompassing said power rotor means about its periphery and comprising a plurality of circumferentially displaced sectors including a first sector having a fresh air outlet through said power rotor means via said chambers and inlets and outlets into said rotor and stator means for internal cooling of said engine, a second sector comprising means for closing off a portion of said power rotor means inlet and outlets to provide a compression stage wherein air is compressed within respective chambers pursuant to rotation of said power rotor means, a third sector in the form of a fueling and deflagration sector for introducing partially flamed fuel into said chambers moving from the compression stage to the fueling stage in a first location and subsequently to a second location displaced circumferentially from the first location to obtain substantially complete deflagration of fuel and maximize expansion of the deflagrating gases, a fourth sector for confining the gases at a constant volume in said chambers, and a fifth sector for exhausting gases through said rotor means and stator means.

8. The invention according to claim 7 and said third sector including a precombustion chamber with interconnected ports spaced circumferentially of the rotor in registering relation with the chambers of the power rotor means at said first and second locations.

9. In a gas turbine engine comprising a rotor with a plurality of radial chambers having open inner and outer ends and arranged to aspirate air thereinto through said inner ends pursuant to rotation of the rotor, means for closing off the outer ends of said chambers while air is being drawn thereinto through the inner ends to compress the air in such chambers, means for closing the compressed air-containing chambers, a precombustion chamber, means for delivering fuel into said precombustion chamber, means for partially igniting the fuel in said precombustion chamber, means for communicating each compressed air-containing chamber with said precombustion chamber, means for delivering a first charge of such fuel sequentially into the compressed air-containing chambers, means for momentarily closing both ends of each chamber charged with the first delivery of fuel to confine expanding gases therein, means for delivering a second charge of fuel from said precombustion chamber into each previously charged chamber, means for closing off each twice charged chamber for confining the expansion of gases therein to obtain a high pressure volume of burned gases, and means for exhausting the burned gases from said last-mentioned chambers into an associated power output receptor.

10. In a gas turbine engine, means effecting rotary compressed air chambers, means providing a precombustion fuel chamber, means for injecting atomized fuel and completely vaporizing the fuel in a small quantity of oxygen and igniting the fuel in the precombustion chamber, and means for directing such vaporized fuel into said compressed air chambers in two individual charges time spaced to obtain separate deflagrations in each chamber, and means for momentarily closing off said chambers between the two charges and after the second charge.

* * * * *